United States Patent
Zhao

(10) Patent No.: US 9,347,828 B1
(45) Date of Patent: May 24, 2016

(54) METHOD FOR DETECTING AMBIENT LIGHT BRIGHTNESS AND APPARATUS FOR ACHIEVING THE METHOD

(71) Applicant: Hui Zhao, Guangdong (CN)

(72) Inventor: Hui Zhao, Guangdong (CN)

( * ) Notice: Subject to any disclaimer, the term of this patent is extended or adjusted under 35 U.S.C. 154(b) by 0 days.

(21) Appl. No.: 14/555,661

(22) Filed: Nov. 27, 2014

(51) Int. Cl.
*G01J 1/42* (2006.01)
*H04N 9/31* (2006.01)
*G01J 1/16* (2006.01)
*H04N 5/58* (2006.01)

(52) U.S. Cl.
CPC ............... *G01J 1/4204* (2013.01); *G01J 1/16* (2013.01); *H04N 9/3155* (2013.01); *H04N 5/58* (2013.01)

(58) Field of Classification Search
CPC .............. G01J 1/4204; G01J 1/10; G01J 1/16; G01J 1/18; G01J 2001/186; G01J 2001/4266; H04N 5/58; H04N 1/00835; H04N 9/31–9/3197
See application file for complete search history.

(56) References Cited

U.S. PATENT DOCUMENTS

| | | | | |
|---|---|---|---|---|
| 2006/0007223 A1* | 1/2006 | Parker | ............ | G01J 1/4204 345/207 |
| 2006/0291049 A1* | 12/2006 | Juenger | ............ | H04N 9/3155 359/443 |
| 2007/0097333 A1* | 5/2007 | Zavarehi | ............ | G03B 21/20 353/85 |
| 2008/0165292 A1* | 7/2008 | Bing | ............ | H04N 9/3194 348/744 |
| 2010/0302515 A1* | 12/2010 | Plut | ............ | H04N 9/3155 353/85 |
| 2014/0247288 A1* | 9/2014 | Zhang | ............ | H04N 5/74 345/690 |
| 2014/0253527 A1* | 9/2014 | Ogi | ............ | G09G 5/02 345/207 |

* cited by examiner

Primary Examiner — Michael P LaPage

(57) ABSTRACT

A method for detecting ambient light brightness comprises the following steps: sensing light from a direction of a projection screen; performing preset operations at an occasion free of projection, so that a first preset image and a second preset image are presented on the projection screen; acquiring light sensing values of the first preset image and the second preset image to obtain a reference value and a threshold value of an ambient light brightness change; after acquiring a current ambient light brightness value, obtaining a change direction and magnitude of actual ambient light brightness according to the reference value and the threshold value; and obtaining a current actual ambient light brightness value according to the change direction and magnitude of the actual ambient light brightness and the light sensing value of the second preset image. An apparatus for detecting ambient light brightness is also provided.

12 Claims, 3 Drawing Sheets

METHOD FOR DETECTING AMBIENT LIGHT BRIGHTNESS AND APPARATUS FOR ACHIEVING THE METHOD

BACKGROUND OF THE INVENTION

The present invention relates to the field of computer technologies, and in particular, to a method and an apparatus for detecting ambient light brightness.

With the development of projection device technologies, projection devices are used in a growing number of places. Especially after the emergence of micro projection devices, because of a small size, portability, and low power consumption of the micro projection devices, a growing number of people accept the micro projection devices. However, a biggest defect of the micro projection devices is that projection flow brightness is unsatisfactory, and ambient light brightness greatly affects a projection image effect; for example, existence of light sources such as natural light and lamplight greatly affects projection image quality of a projection device. Therefore, a technology that can dynamically change local brightness of an image according to an ambient light parameter and image content to enhance image contrast, so that a projected image is clearer, is desirable in the art. However, use of the technology depends on accurate detection of the ambient light brightness, and inaccurate ambient light brightness detection inevitably makes the image algorithm become invalid. Therefore, solving a problem of how to accurately detect ambient light brightness becomes a difficult problem.

In the prior art, a result of ambient light brightness may generally be obtained by using an optical sensor to acquire a light sensing value from a direction in which ambient light needs to be detected. However, if ambient light brightness is detected when a projection device projects an image, what a light sensing component senses is not only ambient light brightness, but also the light from the projected image when the projection device operates; moreover, brightness of the projected image may be higher than actual ambient light brightness. In this case, the optical sensor obtains an ambient light value that includes brightness of the image projected by the projection device, instead of real ambient light brightness.

BRIEF SUMMARY OF THE INVENTION

In view of this, the present invention provides a method and an apparatus for detecting ambient light brightness, so as to improve accuracy of real-time ambient light brightness detection when a projection device projects an image.

The method for detecting ambient light brightness according to an embodiment of the present invention includes:

detecting light from a direction of a projection screen by using an optical sensor deployed on a projection device; performing preset operations at an occasion free of projection, so that a first preset image and a second preset image are presented on the projection screen; acquiring light sensing values of the first preset image and the second preset image, and obtaining a reference value of an ambient light brightness change and a threshold value of the ambient light brightness change according to the light sensing value of the first preset image and the light sensing value of the second preset image; acquiring a current ambient light brightness value in real time, and determining a change direction and magnitude of actual ambient light brightness according to the current ambient light brightness value, the reference value of the ambient light brightness change, and the threshold value of the ambient light brightness change; and obtaining a current actual ambient light brightness value according to the change direction and magnitude of the actual ambient light brightness and the light sensing value of the second preset image.

The apparatus for detecting ambient light brightness according to an embodiment of the present invention includes:

a detecting unit, configured to detect light from a direction of a projection screen by using an optical sensor deployed on a projection device; a processing unit, configured to perform preset operations at an occasion free of projection, so that a first preset image and a second preset image are presented on the projection screen; an acquiring unit, configured to acquire light sensing values of the first preset image and the second preset image; an obtaining unit, configured to obtain a reference value of an ambient light brightness change and a threshold value of the ambient light brightness change according to the light sensing value of the first preset image and the light sensing value of the second preset image, where the acquiring unit is further configured to acquire a current ambient light brightness value in real time; and a determining unit, configured to determine a change direction and magnitude of actual ambient light brightness according to the current ambient light brightness value, the reference value of the ambient light brightness change, and the threshold value of the ambient light brightness change, where the obtaining unit is further configured to obtain a current actual ambient light brightness value according to the change direction and magnitude of the actual ambient light brightness and the light sensing value of the second preset image.

In a method and an apparatus for detecting ambient light brightness that are provided in embodiments of the present invention, when a projection device is at an occasion free of projection, a first preset image and a second preset image are projected onto a projection screen, and a reference value of an ambient light brightness change and a threshold value of the ambient light brightness change are obtained according to a light sensing value of the first preset image and a light sensing value of the second preset image; according to the reference value of the ambient light brightness change and the threshold value of the ambient light brightness change, a change direction and magnitude of actual ambient light brightness are determined, and an actual ambient light brightness value is obtained. This may implement real-time detection of an ambient light brightness change without affecting normal image projection by the projection device, improves accuracy of ambient light brightness detection, and may implement dynamic adjustment of an image parameter according to the ambient light brightness and further improve image quality of a projected image.

To make the foregoing and other purposes, features, and advantages of the present invention clearer and easier to understand, the following provides detailed description by using exemplary embodiments with reference to the accompanying drawings.

DETAILED DESCRIPTION OF THE INVENTION

To further describe technical means and effects of the present invention for implementing a predetermined invention purpose, the following describes specific embodiments, structures, features, and effects on the basis of the present invention in detail with reference to the accompanying drawings and exemplary embodiments.

Figure 1:
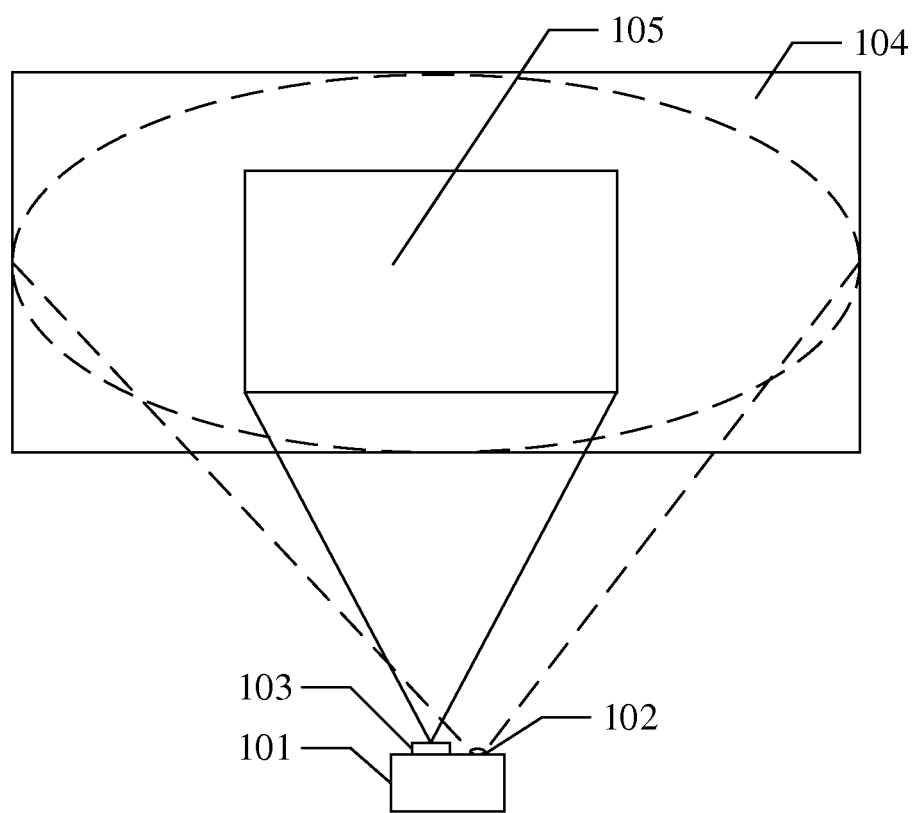
FIG. 1 is a schematic diagram of an application scenario of a method for detecting ambient light brightness according to an embodiment of the present invention.

Referring to FIG. 1, FIG. 1 is a schematic diagram of an application scenario of a method for detecting ambient light brightness according to a first embodiment of the present invention.

A projection device 101 includes an optical sensor 102 and a projection lens 103, and the projection device projects an image 105 onto a projection screen 104 by using the projection lens 103. The optical sensor 102 may sense light from a direction of the projection screen 104, where a sensing range is a range indicated by a dotted ellipse in the projection screen 104 shown in FIG. 1.

Figure 2:
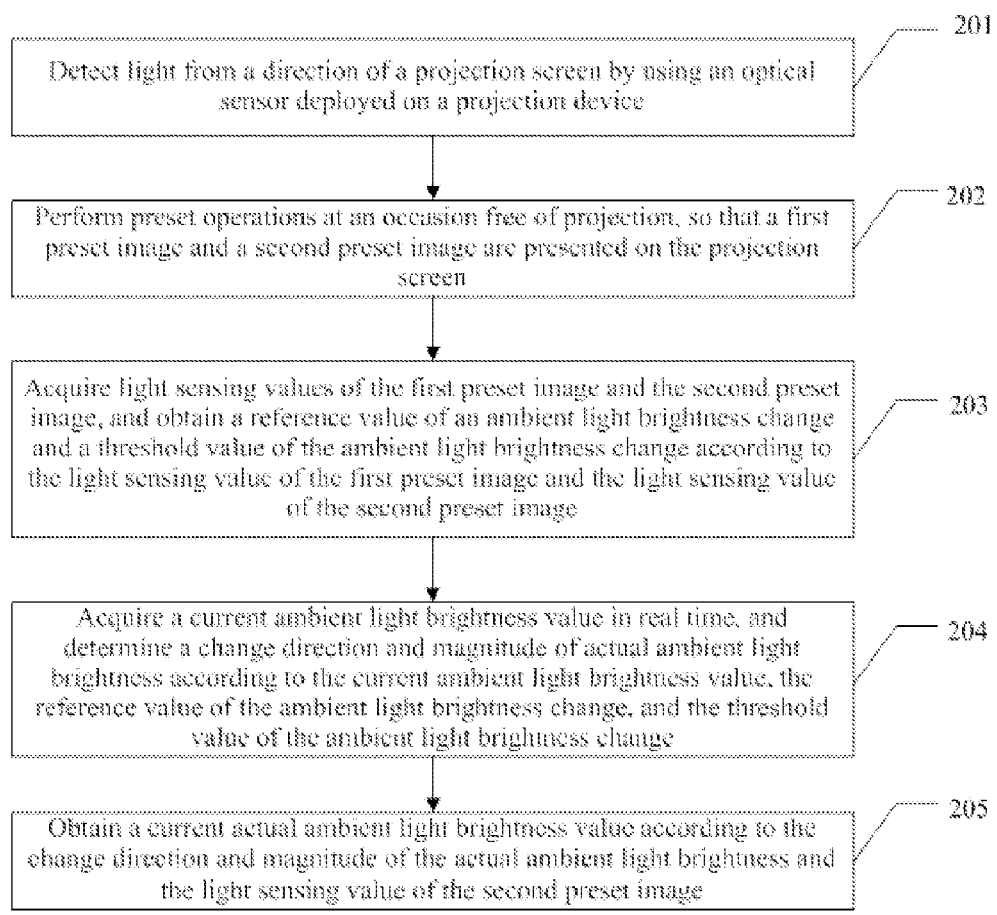
FIG. 2 is a schematic flowchart of a method for detecting ambient light brightness according to a first embodiment of the present invention.

Referring to FIG. 2, FIG. 2 shows a method for detecting ambient light brightness according to an embodiment of the present invention, where the method includes:

Step 201: Detect light from a direction of a projection screen by using an optical sensor deployed on a projection device.

The optical sensor is deployed on the projection device, and a sensing direction of the optical sensor is the same with a direction in which the projection device projects an image onto the projection screen.

Step 202: Perform preset operations at an occasion free of projection, so that a first preset image and a second preset image are presented on the projection screen.

When the projection device is not in a projection state, or a user of the projection device manually operates the projection device to conduct another action except projection, that is, at an occasion free of projection, performing the preset operations does not affect normal projection content viewing by a user.

Specifically, whether the projection device is at an occasion free of projection may be detected in the following two manners:

(1) The projection device detects that an audio/video signal is input; however, the projection device does not complete parsing of the audio/video input signal, and cannot project an image of content about the audio/video signal onto the projection screen; and (2) A user operates a human-machine interface of the projection device, for example, touches a button to switch an image mode.

The preset operations are performed at an occasion free of projection, so that the first preset image and the second preset image are presented on the projection screen.

Specifically, performing the preset operations, so that the first preset image is presented on the projection screen may include: projecting a full-screen all-white image onto the projection screen, so that the all-white image is presented on the projection screen; or projecting a full-screen white image with a preset gray scale onto the projection screen, so that the white image with the preset gray scale is presented on the projection screen; and performing the preset operations, so that the second preset image is presented on the projection screen may include: projecting a full-screen all-black image onto the projection screen, or blocking a lens of the projection device, so that an all-black image is presented on the projection screen.

Step 203: Acquire light sensing values of the first preset image and the second preset image, and obtain a reference value of an ambient light brightness change and a threshold value of the ambient light brightness change according to the light sensing value of the first preset image and the light sensing value of the second preset image.

When a full-screen all-white image is projected onto the projection screen, a sensing value of light from the projection screen acquired by the optical sensor is recorded. When a full-screen white image with a preset gray scale, that is, a known specific gray scale, is projected onto the projection screen, the optical sensor acquires a sensing value of light from the projection screen, and uses the sensing value as a basic parameter to calculate a sensing value of light from the projection screen when a full-screen all-white image is projected. When the projection device projects a full-screen all-white image, a light sensing value acquired by the optical sensor is defined as $SensorDet\_W$.

Then, under a precondition that actual ambient light brightness does not change, at a moment when the projection device projects a full-screen all-white image, because brightness of an all-white image is greater than brightness of an image in another color, a sensing value of light from the projection screen acquired by the optical sensor is a maximum sensing value; that is, in this case, when the projection device projects any image onto the projection screen, a light sensing value acquired by the optical sensor is less than or equal to the maximum sensing value. Herein, the actual ambient light brightness refers to a light sensing value of real ambient light brightness when the projection device does not project any image, and the light sensing value is defined as $SensorDet\_T$.

When there is no influence from actual ambient light brightness, a light sensing value acquired by the optical sensor when the projection device projects an image is defined as $SensorDet\_P$, that is, brightness of a projected image itself.

Further, a light sensing value acquired by the optical sensor at any moment is defined as $SensorDet\_R$, that is, an actual ambient light brightness value $SensorDet\_R$ collected in real time, and then the light sensing value acquired by the optical sensor at any moment is a composition of the actual ambient light brightness and brightness of a projected image. That is, $SensorDet\_R = SensorDet\_T + SensorDet\_P$.

When the projection device projects a full-screen full-brightness white image onto the projection screen, $SensorDet\_R = SensorDet\_W$; therefore, in this case, $SensorDet\_W = SensorDet\_B + SensorDet\_P$; because $SensorDet\_B >= 0$ at any moment, it may be deduced that $SensorDet\_W >= SensorDet\_P$.

In another aspect, under the precondition that the actual ambient light brightness does not change, at a moment when the projection device projects a full-screen all-black image, because brightness of an all-black image is less than brightness of an image in another color, a sensing value of light from the projection screen acquired by the optical sensor is a minimum sensing value; that is, in this case, when the projection device projects any image onto the projection screen, a light sensing value acquired by the optical sensor is greater than or equal to the minimum sensing value.

It should be noted that, when the projection device projects a full-screen all-black image onto the projection screen, a sensing value of light from the projection screen acquired by the optical sensor is equivalent to a value of the actual ambient light brightness, that is, a light sensing value acquired by the optical sensor in a situation in which the projection device is free of projection. When the projection device projects a full-screen all-black image, a light sensing value acquired by the optical sensor is defined as SensorDet_B.

Generally, when the projection device projects a full-screen all-black image onto the projection screen, actual ambient light brightness in surroundings is not affected; therefore, SensorDet_T≈SensorDet_B, and thereby it may be deduced that SensorDet_R=SensorDet_B+SensorDet_P.

Therefore, when the projection device projects a full-screen black image, it is considered that a light sensing value acquired by the optical sensor is 0; that is, when SensorDet_P=0, from SensorDet_R=SensorDet_B+SensorDet_P, it may be deduced that SensorDet_R=SensorDet_B; that is, when a full-screen black image is projected, an acquired light sensing value acquired by the optical sensor is just actual ambient light brightness at that time.

Therefore, it may be determined that a value of SensorDet_B acquired in this case is current actual ambient light brightness, or a value of SensorDet_B in this case may be used as a main reference value of current actual ambient light brightness to set an image parameter of the projection device.

In addition, SensorDet_P>=0 at any moment; therefore, from SensorDet_R=SensorDet_B+SensorDet_P, it may be deduced that SensorDet_R>=SensorDet_B. That is, in a situation in which the actual ambient light brightness does not change, when the projection device projects any image, a sensing value of light from the projection screen acquired by the optical sensor is greater than or equal to a sensing value when a full-screen black image is projected. Therefore, SensorDet_B is used as a minimum light sensing value when the actual ambient light does not change.

Further, the reference value of the ambient light brightness change is defined as EBReference, an average value of the light sensing value of the first preset image and the light sensing value of the second preset image is calculated, and any value in a range that differs by a preset value from the average value is used as the reference value of the ambient light brightness change. That is, a value of (SensorDet_W+SensorDet_B)/2 is calculated, and any value in a range that differs by a preset value from the value is used as the EBReference. For example, (SensorDet_W+SensorDet_B)/2=120, and then any value in a range 110-130 may be set as the EBReference.

Further, a threshold value of a light sensing change acquired by the optical sensor is defined as ΔSensorDet, a half of a difference between the light sensing value of the first preset image and the light sensing value of the second preset image is calculated, and any value in a range that differs by a preset value from a value obtained by calculation is used as the threshold value of the ambient light brightness change. That is, a value of (SensorDet_W−SensorDet_B)/2 is calculated, and any value in a range that differs by a preset value from an obtained value is used as the ΔSensorDet. For example, (SensorDet_W−SensorDet_B)/2=60, and then any value in a range 50-70 may be set as the ΔSensorDet.

Step 204: Acquire a current ambient light brightness value in real time, and determine a change direction and magnitude of actual ambient light brightness according to the current ambient light brightness value, the reference value of the ambient light brightness change, and the threshold value of the ambient light brightness change.

The change direction of the actual ambient light brightness refers to that the actual ambient light brightness becomes brighter or darker, and the change magnitude of the actual ambient light brightness refers to a value of an actual ambient light brightness change.

A current ambient light brightness value SensorDet_R collected in real time is acquired, and whether the actual ambient light brightness changes is determined according to the current ambient light brightness value SensorDet_R, the reference value EBReference of the ambient light brightness change, and the threshold value ΔSensorDet of the ambient light brightness change; if the actual ambient light brightness changes, a change magnitude ΔEBSensor of the actual ambient light brightness is calculated according to the current ambient light brightness value SensorDet_R and the reference value EBReference of the ambient light brightness change.

Specifically, if an absolute value of a difference between the current ambient light brightness value SensorDet_R and the reference value EBReference of the ambient light brightness change is greater than the threshold value ΔSensorDet of the ambient light brightness change, that is, |SensorDet_R−EBReference|>ΔSensorDet, it is determined that the actual ambient light brightness changes. Then, the current ambient light brightness value SensorDet_R is compared with the reference value EBReference of the ambient light brightness change; if SensorDet_R>EBReference, it is determined that the actual ambient light brightness becomes brighter, and if SensorDet_R<EBReference, it is determined that the actual ambient light brightness becomes darker; the absolute value of the difference between the current ambient light brightness value and the reference value of the ambient light brightness change is used as the change magnitude of the actual ambient light brightness; the change magnitude of the actual ambient light brightness is defined as ΔEBSensor, that is, ΔEBSensor=|SensorDet_R−EBReference|.

Step 205: Obtain a current actual ambient light brightness value according to the change direction and magnitude of the actual ambient light brightness and the light sensing value of the second preset image.

If the actual ambient light brightness becomes brighter, the sum of the light sensing value of the second preset image and the change magnitude of the actual ambient light brightness is the actual ambient light brightness value; if the actual ambient light brightness becomes darker, a difference between the light sensing value of the second preset image and the change magnitude of the actual ambient light brightness is the actual ambient light brightness value.

Specifically, after the change direction and the change magnitude of the actual ambient light brightness are obtained by calculation, an actual ambient light brightness after the change is calculated as follows:

when the actual ambient light brightness becomes brighter, SensorDet_T=SensorDet_B+ΔEBSensor; and when the actual ambient light brightness becomes darker, SensorDet_T=SensorDet_B−ΔEBSensor.

A value obtained by calculation is used as a current actual ambient light brightness value, or a value obtained by calculation is used as a main reference value of current actual ambient light brightness to set an image parameter of the projection device.

In this embodiment, when a projection device is at an occasion free of projection, a first preset image and a second preset image are projected onto a projection screen, and a reference value of an ambient light brightness change and a threshold value of the ambient light brightness change are obtained according to a light sensing value of the first preset image and a light sensing value of the second preset image; according to the reference value of the ambient light brightness change and the threshold value of the ambient light brightness change, a change direction and magnitude of actual ambient light brightness are determined, and an actual ambient light brightness value is obtained. This may implement real-time detection of an ambient light brightness change without affecting normal image projection by the projection device, improves accuracy of ambient light brightness detection, and may implement dynamic adjustment of an image parameter according to the ambient light brightness and further improve image quality of a projected image.

Figure 3:
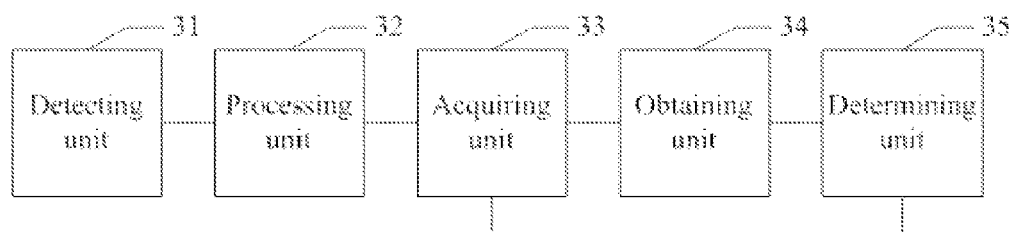
FIG. 3 is a schematic diagram of an apparatus for detecting ambient light brightness according to a second embodiment of the present invention.

Referring to FIG. 3, FIG. 3 is a schematic diagram of an apparatus for detecting ambient light brightness according to a second embodiment of the present invention, where the apparatus includes:

a detecting unit 31, a processing unit 32, an acquiring unit 33, an obtaining unit 34, and a determining unit 35.

The detecting unit 31 is configured to detect light from a direction of a projection screen by using an optical sensor deployed on a projection device;

the processing unit 32 is configured to perform preset operations at an occasion free of projection, so that a first preset image and a second preset image are presented on the projection screen;

the acquiring unit 33 is configured to acquire light sensing values of the first preset image and the second preset image;

the obtaining unit 34 is configured to obtain a reference value of an ambient light brightness change and a threshold value of the ambient light brightness change according to the light sensing value of the first preset image and the light sensing value of the second preset image; where the acquiring unit 33 is further configured to acquire a current ambient light brightness value in real time; and the determining unit 35 is configured to determine a change direction and magnitude of actual ambient light brightness according to the current ambient light brightness value, the reference value of the ambient light brightness change, and the threshold value of the ambient light brightness change; where the obtaining unit 34 is further configured to obtain a current actual ambient light brightness value according to the change direction and magnitude of the actual ambient light brightness and the light sensing value of the second preset image.

For a process of implementing respective function of each unit of the apparatus for detecting ambient light brightness in this embodiment of the present invention, refer to the description in the foregoing embodiment shown in FIG. 2, and details are not described herein again.

In this embodiment, when a projection device is at an occasion free of projection, a first preset image and a second preset image are projected onto a projection screen, and a reference value of an ambient light brightness change and a threshold value of the ambient light brightness change are obtained according to a light sensing value of the first preset image and a light sensing value of the second preset image; according to the reference value of the ambient light brightness change and the threshold value of the ambient light brightness change, a change direction and magnitude of actual ambient light brightness are determined, and an actual ambient light brightness value is obtained. This may implement real-time detection of an ambient light brightness change without affecting normal image projection by the projection device, improves accuracy of ambient light brightness detection, and may implement dynamic adjustment of an image parameter according to the ambient light brightness and further improve image quality of a projected image.

Figure 4:
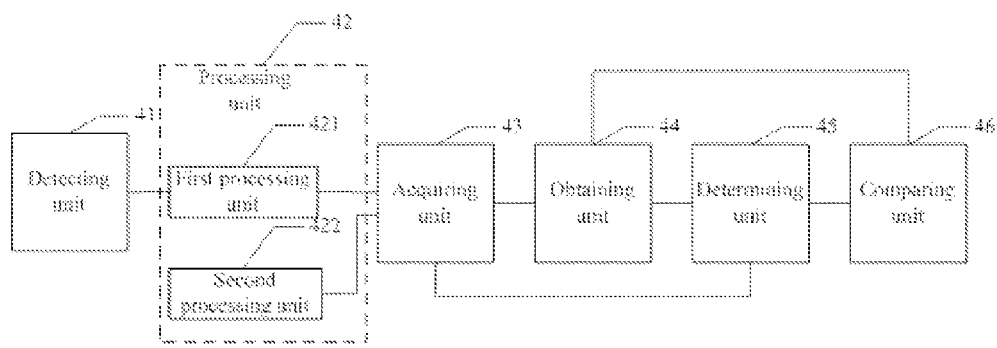
FIG. 4 is a schematic diagram of an apparatus for detecting ambient light brightness according to a third embodiment of the present invention.

Referring to FIG. 4, FIG. 4 is a schematic diagram of an apparatus for detecting ambient light brightness according to a third embodiment of the present invention, where the apparatus includes: a detecting unit 41, a processing unit 42, a first processing unit 421, a second processing unit 422, an acquiring unit 43, an obtaining unit 44, a determining unit 45, and a comparing unit 46.

The detecting unit 41 is configured to detect light from a direction of a projection screen by using an optical sensor deployed on a projection device;

the processing unit 42 is configured to perform preset operations at an occasion free of projection, so that a first preset image and a second preset image are presented on the projection screen;

the acquiring unit 43 is configured to acquire light sensing values of the first preset image and the second preset image;

the obtaining unit 44 is configured to obtain a reference value of an ambient light brightness change and a threshold value of the ambient light brightness change according to the light sensing value of the first preset image and the light sensing value of the second preset image; where the acquiring unit 43 is further configured to acquire a current ambient light brightness value in real time; and the determining unit 45 is configured to determine a change direction and magnitude of actual ambient light brightness according to the current ambient light brightness value, the reference value of the ambient light brightness change, and the threshold value of the ambient light brightness change; where the obtaining unit 44 is further configured to obtain a current actual ambient light brightness value according to the change direction and magnitude of the actual ambient light brightness and the light sensing value of the second preset image.

The processing unit 42 may further include:

a first processing unit 421, configured to project a full-screen all-white image or a full-screen white image with a preset gray scale onto the projection screen, so that the all-white image or the white image with the preset gray scale is presented on the projection screen; and a second processing unit 422, configured to project a full-screen all-black image onto the projection screen, or closing a lens of the projection device, so that an all-black image is presented on the projection screen.

Further, the acquiring unit 43 is further configured to acquire a light sensing value of the all-white image, or acquire a light sensing value of the white image with the preset gray scale;

the obtaining unit 44 is further configured to calculate a light sensing value of an all-white image according to the preset gray scale and the acquired light sensing value of the white image with the preset gray scale;

the obtaining unit 44 is further configured to calculate an average value of the light sensing value of the first preset image and the light sensing value of the second preset image, and use any value in a range that differs by a preset value from the average value as the reference value of the ambient light brightness change;

the obtaining unit 44 is further configured to calculate a half of a difference between the light sensing value of the first preset image and the light sensing value of the second preset image, and use any value in a range that differs by a preset value from a value obtained by calculation as the threshold value of the ambient light brightness change; and the determining unit 45 is further configured to, if an absolute value of a difference between the current ambient light brightness value and the reference value of the ambient light brightness change is greater than the threshold value of the ambient light brightness change, determine that the actual ambient light brightness changes.

Further, the apparatus further includes:

a comparing unit 46, configured to compare the current ambient light brightness value with the reference value of the ambient light brightness change; if the current ambient light brightness value is greater than the reference value of the ambient light brightness change, the actual ambient light brightness becomes brighter; and if the current ambient light brightness value is less than the reference value of the ambient light brightness change, the actual ambient light brightness becomes darker; where the obtaining unit 44 is further configured to use an absolute value of a difference between the current ambient light brightness value and the reference value of the ambient light brightness change as a change magnitude of the actual ambient light brightness; and the obtaining unit 44 is further configured to, if the actual ambient light brightness becomes brighter, use the sum of the light sensing value of the second preset image and the change magnitude of the actual ambient light brightness as the actual ambient light brightness value; if the actual ambient light brightness becomes darker, use a difference between the light sensing value of the second preset image and the change magnitude of the actual ambient light brightness as the actual ambient light brightness value.

For a process of implementing respective function of each unit of the apparatus for detecting ambient light brightness in this embodiment of the present invention, refer to the description in the foregoing embodiments shown in FIG. 2 and FIG. 3, and details are not described herein again.

In this embodiment, when a projection device is at an occasion free of projection, a first preset image and a second preset image are projected onto a projection screen, and a reference value of an ambient light brightness change and a threshold value of the ambient light brightness change are obtained according to a light sensing value of the first preset image and a light sensing value of the second preset image; according to the reference value of the ambient light brightness change and the threshold value of the ambient light brightness change, a change direction and magnitude of actual ambient light brightness are determined, and an actual ambient light brightness value is obtained. This may implement real-time detection of an ambient light brightness change without affecting normal image projection by the projection device, improves accuracy of ambient light brightness detection, and may implement dynamic adjustment of an image parameter according to the ambient light brightness and further improve image quality of a projected image.

It should be noted that in this specification, relational terms such as first and second are used merely to differentiate an entity or operation from another entity or operation, and do not require or imply that any actual relationship or sequence exists between these entities or operations. Moreover, terms "comprise", "include", or any other variants thereof are intended to cover non-exclusive inclusion so that a process, method, article, or apparatus that includes a series of elements not only includes these very elements, but may also include other elements not expressly listed, or also include elements inherent to this process, method, article, or apparatus. Without being subject to further limitations, an element defined by a phrase "including a . . . " does not exclude presence of other identical elements in the process, method, article, or apparatus that includes the very element.

A person of ordinary skill in the art may understand that all or a part of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention in any form. Though the exemplary embodiments have been used to disclose the present invention, they are not used to limit the present invention. Some changes or modifications made by a person skilled in the art by using the foregoing disclosed technical content without departing from the technical solution range of the present invention are equivalent embodiments with equivalent changes. Any simple amendment, equivalent change, or modification of the foregoing embodiments made on the basis of the technical essence of the present invention without departing from the technical solution content of the present invention is still in the technical solution range of the present invention.

What is claimed is:

1. A method for detecting ambient light brightness, comprising:
   detecting light from a direction of a projection screen by using an optical sensor deployed on a projection device;
   performing preset operations at an occasion free of projection, so that a first preset image and a second preset image are presented on the projection screen;
   acquiring light sensing values of the first preset image and the second preset image, and obtaining a reference value of an ambient light brightness change and a threshold value of the ambient light brightness change according to the light sensing value of the first preset image and the light sensing value of the second preset image;
   acquiring a current ambient light brightness value in real time, and determining a change direction and magnitude of actual ambient light brightness according to the current ambient light brightness value, the reference value of the ambient light brightness change, and the threshold value of the ambient light brightness change; and
   obtaining a current actual ambient light brightness value according to the change direction and magnitude of the actual ambient light brightness and the light sensing value of the second preset image.

2. The method according to claim 1, wherein the performing preset operations, so that a first preset image is presented on the projection screen comprises:
   projecting a full-screen all-white image or a full-screen white image with a preset gray scale onto the projection screen, so that the all-white image or the white image with the preset gray scale is presented on the projection screen.

3. The method according to claim 2, wherein acquiring a light sensing value of the first preset image comprises:
   acquiring a light sensing value of the all-white image;
   or,
   acquiring a light sensing value of the white image with the preset gray scale, and calculating a light sensing value of an all-white image according to a preset gray scale or the acquired light sensing value of the white image with the preset gray scale.

4. The method according to claim 1, wherein the performing preset operations, so that a second preset image is presented on the projection screen comprises:
   projecting a full-screen all-black image onto the projection screen, or blocking a lens of the projection device, so that an all-black image is presented on the projection screen.

5. The method according to claim 1, wherein the obtaining a reference value of an ambient light brightness change according to the tight sensing value of the first preset image and the light sensing value of the second preset image comprises:

calculating an average value of the light sensing value of the first preset image and the light sensing value of the second preset image, and using any value in a range that differs by a preset value from the average value as the reference value of the ambient light brightness change.

6. The method according to claim 1, wherein the obtaining a threshold value of an ambient light brightness change according to the light sensing value of the first preset image and the light sensing value of the second preset image comprises:

calculating a half of a difference between the light sensing value of the first preset image and the light sensing value of the second preset image, and using any value in a range that differs by a preset value from a value obtained by calculation as the threshold value of the ambient light brightness change.

7. The method according to claim 5, wherein the determining a change direction and magnitude of actual ambient light brightness according to the current ambient light brightness value, the reference value of the ambient light brightness change, and the threshold value of the ambient light brightness change comprises:

if the optical sensor detects light from a direction of a projection screen, performing preset operations at an occasion free of projection, so that an absolute value of a difference between the current ambient light brightness value and the reference value of the ambient light brightness change is greater than the threshold value of the ambient light brightness change, and then it is determined that the actual ambient light brightness changes;

comparing the current ambient light brightness value with the reference value of the ambient light brightness change; if the current ambient light brightness value is greater than the reference value of the ambient light brightness change, the actual ambient light brightness has become brighter; and if the current ambient light brightness value is less than the reference value of the ambient light brightness change, the actual ambient light brightness has become darker; and using an absolute value of a difference between the current ambient light brightness value and the reference value of the ambient light brightness change as a change in magnitude of the actual ambient light brightness.

8. The method according to claim 7, wherein the obtaining an actual ambient light brightness value according to the change direction and magnitude of the actual ambient light brightness and the light sensing value of the second preset image comprises:

if the actual ambient light brightness becomes brighter, the sum of the light sensing value of the second preset image and the change in magnitude of the actual ambient light brightness is the actual ambient light brightness value; if the actual ambient light brightness becomes darker, a difference between the light sensing value of the second preset image and the change in magnitude of the actual ambient light brightness is the actual ambient light brightness value.

9. An apparatus for detecting ambient light brightness, comprising:

a detecting unit, configured to detect light from a direction of a projection screen by using an optical sensor deployed on a projection device;

a processing unit, configured to perform preset operations at an occasion free of projection, so that a first preset image and a second preset image are presented on the projection screen;

an acquiring unit, configured to acquire light sensing values of the first preset image and the second preset image;

an obtaining unit, configured to obtain a reference value of an ambient light brightness change and a threshold value of the ambient light brightness change according to the light sensing value of the first preset image and the light sensing value of the second preset image; wherein the acquiring unit is further configured to acquire a current ambient light brightness value in real time; and a determining unit, configured to determine a change direction and magnitude of actual ambient light brightness according to the current ambient light brightness value, the reference value of the ambient light brightness change, and the threshold value of the ambient light brightness change; wherein the obtaining unit is further configured to obtain a current actual ambient light brightness value according to the change direction and magnitude of the actual ambient light brightness and the light sensing value of the second preset image.

10. The apparatus according to claim 9, wherein the processing unit further comprises:

a first processing unit, configured to project the first preset image being a full-screen ail-white image or a full-screen white image with a preset gray scale onto the projection screen, so that the all-white image or the white image with the preset gray scale is presented on the projection screen; and a second processing unit, configured to project the second preset image being a full-screen ail-black image onto the projection screen, or blocking a lens of the projection device, so that an all-black image is presented on the projection screen.

11. The apparatus according to claim 9, wherein:

the first preset image is an all-white image or a white image with a preset gray scale;

when the acquiring unit has acquired the light sensing value of the first preset image which being the all-white image, the obtaining unit calculates a light sensing value of the all-white image according to a preset pray scale; or when the acquiring unit has acquired the light sensing value of the first preset image which being the white image with the preset gray scale, the obtaining unit calculates the light sensing value of the all-white image according to the acquired light sensing value of the first preset image which being the white image with the preset gray scale;

the obtaining unit obtains the reference value of the ambient light brightness change by calculating an average value of the light sensing value of the first preset image and the light sensing value of the second preset image, and using any value in a range that differs by a preset value from the average value as the reference value of the ambient light brightness change; and the obtaining unit obtains the threshold value of the ambient light brightness change by calculating a half of a difference between the light sensing value of the first preset image and the light sensing value of the second preset image, and using any value in a range that differs by a preset value from a value obtained by calculating a half of a difference between the light sensing value of the first preset image and the light sensing value of the second preset image as the threshold value of the ambient light brightness change.

12. The apparatus according to claim 11, wherein:

the determining unit is further configured to, if an absolute value of a difference between the current ambient light brightness value and the reference value of the ambient light brightness change is greater than the threshold value of the ambient light brightness change, determine that the actual ambient light brightness changes;

the apparatus further comprises:

a comparing unit, configured to compare the current ambient light brightness value with the reference value of the ambient light brightness change; if the current ambient light brightness value is greater than the reference value of the ambient light brightness change, the actual ambient light brightness has become brighter, and if the current ambient light brightness value is less than the reference value of the ambient light brightness change, the actual ambient light brightness has become darker; wherein the obtaining unit is further configured to use an absolute value of a difference between the current ambient light brightness value and the reference value of the ambient light brightness change as a change in magnitude of the actual ambient light brightness; and the obtaining unit is further configured to, if the actual ambient light brightness becomes brighter, use the sum of the light sensing value of the second preset image and the change in magnitude of the actual ambient light brightness as the actual ambient light brightness value; if the actual ambient light brightness becomes darker, use a difference between the light sensing value of the second preset image and the change in magnitude of the actual ambient light brightness as the actual ambient light brightness value.

* * * * *